(12) United States Patent
Stoesz et al.

(10) Patent No.: US 7,607,477 B2
(45) Date of Patent: Oct. 27, 2009

(54) OPTICAL WET CONNECT

(75) Inventors: Carl W. Stoesz, Houston, TX (US); Walter S. Going, III, Houston, TX (US); Steve Rosenblatt, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 290 days.

(21) Appl. No.: 11/516,348

(22) Filed: Sep. 6, 2006

(65) Prior Publication Data

US 2008/0078556 A1    Apr. 3, 2008

(51) Int. Cl.
*E21B 17/00* (2006.01)
*H01R 4/60* (2006.01)
*E21B 17/02* (2006.01)

(52) U.S. Cl. .................. 166/242.6; 166/65.1; 166/378; 166/380; 439/194

(58) Field of Classification Search .................. 166/378, 166/242.6, 380, 242.7, 56.1; 439/191, 192, 439/194, 195
See application file for complete search history.

(56) References Cited

U.S. PATENT DOCUMENTS

| | | | |
|---|---|---|---|
| 4,510,797 A | 4/1985 | Guidry et al. | |
| 4,856,760 A | 8/1989 | Frost et al. | |
| 4,948,097 A | 8/1990 | Reeve et al. | |
| 4,990,033 A | 2/1991 | Handley et al. | |
| 5,022,634 A | 6/1991 | Keeble | |
| 5,058,683 A | 10/1991 | Godfrey et al. | |
| 5,199,689 A | 4/1993 | Proud et al. | |
| 5,205,542 A | 4/1993 | Keeble | |
| 5,577,925 A | 11/1996 | Schnatzmeyer et al. | |
| 6,186,229 B1 | 2/2001 | Martin et al. | |
| 6,209,648 B1 | 4/2001 | Ohmer et al. | |
| RE37,283 E | 7/2001 | Kluth et al. | |
| 6,390,193 B1 | 5/2002 | Martin et al. | |
| 6,439,932 B1 | 8/2002 | Ripolone | |
| RE38,052 E | 4/2003 | Kluth | |
| 6,755,253 B2 | 6/2004 | Smith et al. | |

(Continued)

OTHER PUBLICATIONS

Corbett, Gary, et al., "Fiber Optic Monitoring in Openhole gravel Pack Completions", SPE 77682, 2002, 1-14.
Dines Chris, et al., "An Operational Subsea Wireline System", SPE 17662, Feb. 1989, 171-195.

(Continued)

*Primary Examiner*—Jennifer H Gay
*Assistant Examiner*—Brad Harcourt
(74) *Attorney, Agent, or Firm*—Steve Rosenblatt

(57) ABSTRACT

A cable that delivers power, signals, or information is wet connected downhole. The lower portion of the cable can be in an auxiliary conduit to a main tubular and be installed already connected to sensors, instruments or other downhole equipment. The connection is made up downhole to connect a string with its auxiliary conduit to the portion of the string and its auxiliary conduit that are below. The cable already in the hole has an upper end ferrule for connection to a ferrule on the lower end of a cable delivered into the upper auxiliary conduit after the wet connect is made up. When the ferrules connect they are held together and a signal goes to the surface that they have connected. The auxiliary connected conduits have a lateral conduit in fluid communication for use in delivery of the cable with circulating fluid.

24 Claims, 1 Drawing Sheet

U.S. PATENT DOCUMENTS

Figure 1:
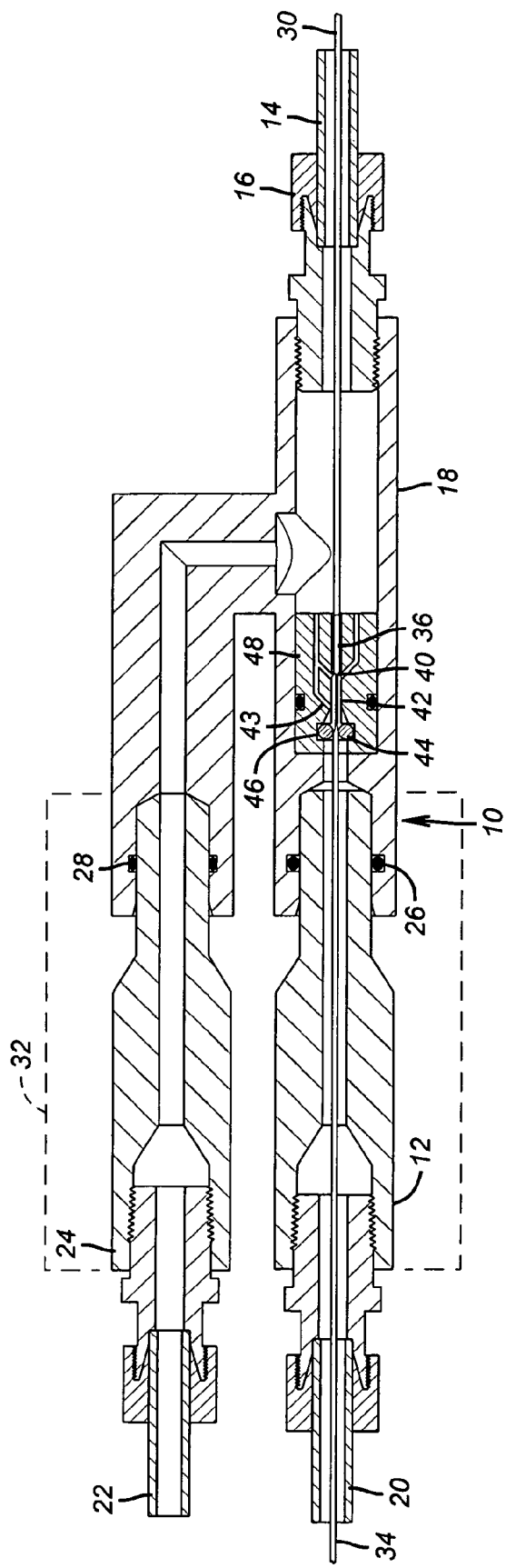

2003/0221829 A1* 12/2003 Patel et al. ................. 166/278
2006/0260818 A1* 11/2006 Meijer et al. ................ 166/380
2006/0283606 A1* 12/2006 Partouche et al. ........... 166/380
2008/0047703 A1* 2/2008 Stoesz et al. ............... 166/65.1

OTHER PUBLICATIONS

Griffin, R.C., et al., "Quick Intervention: Going Lighter and Running Faster with Gastight Rotary Shouldered Connection!", IADC/SPE 112773, Mar. 2008, 1-7.

* cited by examiner

OPTICAL WET CONNECT

FIELD OF THE INVENTION

The field of this invention relates to making a connection to a cable downhole where a portion of it is in the hole and the mating portion is subsequently delivered for connection to the surface.

BACKGROUND OF THE INVENTION

Techniques have been developed by telecom companies to advance fiber optic cable through a conduit. Typical of such techniques are U.S. Pat. Nos. 4,856,760; 4,948,097; 4,990,033; 5,022,634; 5,199,689 and 5,205,542. More recently, techniques for pumping fiber optic cable through a conduit to a downhole location and then back to the surface through a u-shaped turn at the downhole location have been developed as illustrated in U.S. Pat. RE 37,283 and RE 38,052. These downhole designs addressed getting well temperature profiles through the fiber optic cable. The nature of the delivery technique did not lend itself to connection to downhole sensors or instruments or other equipment that was already downhole. Thus a need exists that is addressed by the present invention of how to connect downhole devices to the surface when they are already in the hole.

One style of wet connectors for electrical applications involves a male component with an exterior contact band and a female counterpart component with a band on an interior surface. The portion of the string left in the well has a first hub generally with the female component looking up. The string run in from the surface has a second hub with the male component extending down longitudinally. The hub being run in is rotationally oriented as it advances toward the female hub so that the banded male and female components line up before being pushed together until the electrical contacts on each are opposite each other to complete the circuit. Some examples are U.S. Pat. Nos. 6,439,932 and 4,510,797. Wet connectors that complete tubing circuits in a similar manner are illustrated in U.S. Pat. Nos. 6,755,253; 6,390,193 and 6,186,229. Some connectors combine connection of electrical lines and hydraulic lines as illustrated in U.S. Pat. No. 6,209,648. Wet connectors for wireline that involve an indexing feature without a main bore in the connection are illustrated in U.S. Pat. No. 5,058,683.

Some connectors involve a polished bore receptacle and a string that is inserted into it. The receptacle has a button extending radially into the bore and the string has on its exterior a circumferential ring that is an open scroll with bent up edges. When the string is fully inserted into the polished bore receptacle the central conduit is joined and the bent tabs are said to find the button to make electrical contact in the polished bore with no need for rotational alignment. This design is illustrated in U.S. Pat. No. 5,577,925.

Thus, a need exists that is addressed by the present invention of how to connect downhole devices to the surface with a cable when they are already in the hole. The present invention addresses this need by allowing the sensors, instruments or power driven equipment to be installed in the desired location in the well and allowing them to be connected to cable for power or/and signal transmission up to a downhole connection, known in the art as a wet connect. A string can be run from the surface with the other half of the wet connection and mated up downhole. As a result, the main bore and the auxiliary bore become connected downhole. The lower portion of the auxiliary bore has the cable in it already connected to downhole sensors or devices that are already in position. After the wet connect is made up, the invention allows the cable for power, signal, or any other purpose to be delivered down the auxiliary conduit that is now connected from the downhole devices to the surface, until a connection to the lower portion of that cable is made downhole. A feature can also be provided to retain the connection together and to give a surface signal that the connection has been made. These and other features of the present invention will be more readily apparent to those skilled in the art from a review of the description of the preferred embodiment below and the associated drawings with the understanding that the full scope of the invention is to be found in the claims.

SUMMARY OF THE INVENTION

A cable that delivers power, signals, or information is wet connected downhole. The lower portion of the cable can be in an auxiliary conduit to a main tubular and be installed already connected to sensors, instruments or other downhole equipment. The connection is made up downhole to connect a string with its auxiliary conduit to the portion of the string and its auxiliary conduit that are below. The cable already in the hole has an upper end ferrule for connection to a ferrule on the lower end of a cable delivered into the upper auxiliary conduit after the wet connect is made up. When the ferrules connect they are held together and a signal goes to the surface that they have connected. A bypass port allows replacement of the original fluid with a second fluid after connection has been made. The auxiliary connected conduits have a lateral conduit in fluid communication for use in delivery of the cable with circulating fluid.

DETAILED DESCRIPTION OF THE DRAWING

FIG. 1 is a section view shown schematically just before the cable segments connect.

DETAILED DESCRIPTION OF THE PREFERRED EMBODIMENT

FIG. 1 shows a female component 10 and a male component 12 of a downhole wet connector that is generally of a type known in the art with some modifications. While the drawing is schematic, those skilled in the art will appreciate that only the portion of the wet connect that is of interest is illustrated. The main tubulars that get connected when this joint is made up are not shown for clarity of understanding of the invention. Instead a lower auxiliary line 14 is connected through a connector 16 to a hub 18, which is a part of the female connector 10. The lower portion of a tubular string (not shown) is also connected to hub 18 so that when the components 10 and 12 are brought together, the main tubular (not shown) winds up being connected from the surface at hub 18 and well as upper auxiliary conduit 20 to lower auxiliary conduit 14, again at hub 18.

In the preferred embodiment, a second upper auxiliary conduit 22 has a male wet connect component 24 on its end for engaging hub 18 so as to provide a circulation path back to the surface from a fluid circuit that begins at the surface with conduit 20 and continues through hub 18 and back to the surface through component 24 and conduit 22. Generally speaking the conduits 20 and 22 will run parallel to each other on the upper string (not shown) with a singular male component 12 at its lower end. In essence, in the actual product, there will be several male connection locations in hub 12 that are parallel to each other. The main conduit connection (not shown) will be generally near the center with the auxiliary male connections on a common radius around the center of the male component 12. Each male component that enters the hub 18 is sealed with a seal 26 or 28. In the case of the connection between conduit 14 and hub 18 that connection is made at the surface before the lower string (not shown) that has hub 18 at its upper end is run into the hole and properly supported such as by a packer or anchor (not shown). Cable 30 is also assembled into conduit 14 and connected to the downhole devices that it will interact with all at the surface before the assembly is run in and properly supported. Optionally, the conduit 14 can also be connected to a pressure actuated downhole tool such as a subsurface safety valve. In that case a cable can run through conduit 14 and to one downhole device while a tee is connected to another device that runs on pressure. Pressure can then be applied from conduit 20 before the cable 34 is pumped down or down through conduit 22 while retaining cable 34 in position, to communicate with conduit 14 through hub 18. Depending on the configuration there can be a conduit such as 22 associated with each conduit 20 and its respective mating conduit 14. If that is done discrete downhole devices can be reached for pressure operation while also having the capability of making an electrical connection at the same time. If the cables are in place and connected, they can stay connected with pressure coming down a line such as 22 and going to a connected pressure operated device. Thus, the lower end of cable 30 is fully pre-wired to sensors, instruments, downhole tools, processors or whatever is down the hole when the assembly whose top end is hub 18 is run in the hole and supported.

The mating hub to hub 18 arrives with the upper end of the tubular string (not shown) and with conduits 20 and 22 connected to the male hub 32 shown schematically in dashed lines and a part of which can be considered male connectors 12 and 24. As hub 32 approaches the hub 18 that is already supported in the well with cable 30 connected to where it needs to go, conduit 20 does not have the cable 34 inside it. Cable 30 has a ferrule 36 secured in hub 18 in a seat 48 with a tip 40 exposed to passage 42.

After conduits 20 and 22 are connected to hub 18 through male hub 32 the cable 34 is delivered from the surface through conduit 20 preferably by fluid circulation through a circuit that starts at the surface and goes through conduit 20, hubs 32 and 18 that are connected, and out though conduit 22 and back to the surface. The circulating fluid brings cable 34 and its leading ferrule 44 toward passage 42. Ferrule 44 passes a lock 46 that allows ferule 44 to advance through passage 42 to contact ferrule 36. The lock 46 prevents ferrule 44 from retreating out of contact from ferrule 36 once contact has been made. The fluid that is used to advance ferrule 44 down conduit 20 flows through passages 48 that become obstructed when ferrule 44 advances to a contacting position with ferrule 36. In that manner, a signal to the surface is delivered in the form of a spike in pressure of the circulating fluid to indicate that the ferrules have made contact. Bypass passage 43 allows for a low flow rate around the ferrule 44. This feature can be used to pump out the original fluid and replace it with a second fluid. The bypass passage is sized such that a pressure indication will still be observed at the surface. Surface personnel can then test the integrity of the contact by determining if the circuits through the cables 34 and 30 are complete. One means of doing so is to monitor the fiber while injection is taking place. A rotary optical connection connected between the spool of optic fiber and an optical time domain reflectometer (OTDR) is an example of how this is done.

The cables 34 and 30 can be a single strand fiber optic or a multi-strand cable. Hub 18 can provide an orientation lug to rotate ferrule 44 to properly align the strands to be sure the right ones get connected. These cables as that term is used here can convey power, signals, data in the form of electricity light or other forms and a single cable can have multiple purposes or a single purpose, depending on the application. Delivery of the ferrule 44 can be accomplished with pumping a viscous fluid, circulating a gas, mechanically advancing the cable 34 or other comparable delivery techniques. The lock 46 can take a variety of forms one example being wheels that accept the ferrule 44 by rotating in a given direction without the capability to reverse. Other ratchet devices are also contemplated. The lock can be of a design where it can be defeated by pumping down conduit 22. In this configuration it could be a spring or an o-ring. This operation will back the ferrule 44 out if its respective conduit and back uphole. If there are several parallel conduits to conduit 20 when pumping down conduit 22 the conduit where it is desired to retrieve the cable can be left alone while the others are pressurized. This configuration with the option of pumping downhole in conduit 22 at the same time will only move the ferrule in the desired conduit back uphole while leaving the others in place. Conduit 30 can be multi-purpose by serving as a conduit to protect cable 30 and by allowing the transmission of fluid pressure to a downhole tool such as a subsurface safety valve, for example that is actuated through application or removal or pressure from conduit 22 at the surface. While only a single conduit 20 has been shown to simplify the presentation, those skilled in the art will appreciate that many conduits can be run parallel to conduit 20 to connect to counterparts to conduit 14 so that many cables in different connected pairs of conduits at hubs 18 and 32 can be run to connect to a variety of devices already pre-connected when hub 18 and everything below it was initially run into the well. Conduit 22 can be common to those other pairs of conduits connecting through mating hubs 18 and 32 or in the alternative each connected pair of conduits can have its own recirculation path to the surface from connected hubs 18 and 32. The ferrules are but one option for an end contact for cable components. These ferrules can make the connection by abutting with a lock to prevent disengagement or they can interlock when contacting to integrate a lock feature simply by virtue of being run together.

Those skilled in the art will appreciate that there now is an ability to pre-wire the downhole components and simply run a cable from the surface to link at a downhole wet connect. There is no need to run the cable in an auxiliary conduit from the surface to a hub such as 32. Rather, the mechanical connection can be made up at the wet connect downhole with the lower hub pre-wired to the downhole sensors, processors or other downhole devices. The mechanical integrity of the connected conduits can be tested and confirmed. If they check out, then the cables can be delivered. This is to be contrasted with running the cables bare or in conduits connected to a hub such as 32 only to learn after mating hubs 18 and 32 that a conduit is damaged or that the cable connected to hub 32 is somehow damaged.

While the preferred embodiment has been set forth above, those skilled in art will appreciate that the scope of the invention is significantly broader and as outlined in the claims which appear below.

We claim:

1. A cable connection for downhole use, comprising:
  a lower string further comprising a first hub adjacent an upper end thereof and at least one first cable connection in said first hub further comprising at least one first cable extending from said first cable connection and operatively connected to at least one downhole device;

an upper string comprising a second hub adjacent a lower end and at least one upper conduit extending from said hub along said upper string,
said hubs when connected downhole provide an alignment of said at least one upper conduit with a passage to said at least one first cable connection; and
at least one second cable having a second cable connection adjacent a lower end thereof that are first delivered into said upper conduit after said hubs are connected downhole to make contact with said at least one first cable connection.

2. The connection of claim 1, wherein:
said at least one upper conduit comprises at least two upper conduits in fluid communication with said passage.

3. The connection of claim 2, wherein:
said upper conduits and said passage define a circuit through which any fluid originally present therein can be replaced.

4. The connection of claim 1, wherein:
said passage further comprises a capture device for said second cable connection to retain it in connection with said first cable connection.

5. The connection of claim 1, further comprising:
a lower conduit extending from said first hub to the downhole device with said first cable disposed therein.

6. The connection of claim 1, wherein:
said hubs comprise a wet connection made up downhole.

7. The connection of claim 1, wherein:
said first and second cables each comprise discrete elements which align in said passage.

8. The connection of claim 7, wherein:
said passage comprises an orientation feature for said second cable connection to induce it to rotate to align said discrete elements.

9. The connection of claim 1, wherein:
said cables comprise at least one fiber optic stand.

10. The connection of claim 1, wherein:
said cables comprise at least one each of a fiber optic strand, a power transmission wire, a data transmission wire or a signal wire.

11. The connection of claim 1, wherein:
said first hub comprises a plurality of pairs of first cable connections and said second hub comprises a plurality of upper conduits each leading to a discrete passage where a first cable connection is disposed to allow discrete couplings of first and second cable connections through said hubs, when assembled to each other.

12. A cable connection for downhole use, comprising:
a lower string further comprising a first hub adjacent an upper end thereof and at least one first cable connection in said first hub further comprising at least one first cable extending from said first cable connection and operatively connected to at least one downhole device;
an upper string comprising a second hub adjacent a lower end and at least one upper conduit extending from said hub along said upper string,
said hubs when connected downhole provide an alignment of said at least one upper conduit with a passage to said at least one first cable connection; and
at least one second cable having a second cable connection adjacent a lower end thereof that, upon delivery through said at least one upper conduit to said passage after connection of said hubs, makes contact with said at least one first cable connection;
said second cable connection at least in part obstructs said passage upon arrival therein to allow a signal of its arrival to go uphole.

13. A cable connection for downhole use, comprising:
a lower string further comprising a first hub adjacent an upper end thereof and at least one first cable connection in said first hub further comprising at least one first cable extending from said first cable connection and operatively connected to at least one downhole device;
an upper string comprising a second hub adjacent a lower end and at least one upper conduit extending from said hub along said upper string,
said hubs when connected downhole provide an alignment of said at least one upper conduit with a passage to said at least one first cable connection; and
at least one second cable having a second cable connection adjacent a lower end thereof that, upon delivery through said at least one upper conduit to said passage after connection of said hubs, makes contact with said at least one first cable connection;
said at least one upper conduit comprises at least two upper conduits in fluid communication with said passage;
said second cable connection is deliverable through a circuit with circulating fluid comprising said upper conduit through said passage and back up through another said upper conduit.

14. The connection of claim 13, wherein:
said second cable is removable from a connection to said first cable connection with a reversal of circulation in said circuit.

15. A cable connection for downhole use, comprising:
a lower string further comprising a first hub adjacent an upper end thereof and at least one first cable connection in said first hub further comprising at least one first cable extending from said first cable connection and operatively connected to at least one downhole device;
an upper string comprising a second hub adjacent a lower end and at least one upper conduit extending from said hub along said upper string,
said hubs when connected downhole provide an alignment of said at least one upper conduit with a passage to said at least one first cable connection; and
at least one second cable having a second cable connection adjacent a lower end thereof that, upon delivery through said at least one upper conduit to said passage after connection of said hubs, makes contact with said at least one first cable connection;
said at least one upper conduit comprises at least two upper conduits in fluid communication with said passage;
said second cable connection is deliverable through a circuit with circulating fluid comprising said upper conduit through said passage and back up through another said upper conduit;
arrival of said second cable connection in said passage at least partially obstructs said circuit to send a pressure signal to the surface of contact between said cable connections.

16. A cable connection for downhole use, comprising:
a lower string further comprising a first hub adjacent an upper end thereof and at least one first cable connection in said first hub further comprising at least one first cable extending from said first cable connection and operatively connected to at least one downhole device;
an upper string comprising a second hub adjacent a lower end and at least one upper conduit extending from said hub along said upper string,
said hubs when connected downhole provide an alignment of said at least one upper conduit with a passage to said at least one first cable connection; and at least one second cable having a second cable connection adjacent a lower end thereof that, upon delivery through said at least one upper conduit to said passage after connection of said hubs, makes contact with said at least one first cable connection;

said first hub comprises a plurality of pairs of first cable connections and said second hub comprises a plurality of upper conduits each leading to a discrete passage where a first cable connection is disposed to allow discrete couplings of first and second cable connections through said hubs, when assembled to each other;

wherein said discrete passages are fluidly connected to a dedicated upper conduit which is not aligned into a passage for contact access to a first cable connection.

17. A method of making a downhole connection, comprising:

running in a lower assembly comprising a lower hub with at least one lower cable connection thereon which is connected to a downhole device by a lower cable;

supporting the lower assembly in the well;

running in an upper assembly with an upper hub and at least one upper conduit extending into said upper hub;

connecting said hubs downhole;

aligning said upper conduit with said cable connection by said connecting; and initially delivering an upper cable connection, connected to an upper cable, into and through said upper conduit and into contact with said lower cable connection only after said connecting.

18. The method of claim 17, comprising:

holding a second cable connection against said first cable connection to maintain their contact.

19. The method of claim 17, comprising:

providing multiple elements in said cables to their respective connections; and aligning said elements before or as said connections make contact.

20. The method of claim 17, comprising:

providing at least one of a fiber optic strand, a power line, a data line or a signal line as said cables.

21. A method of making a downhole connection, comprising:

running in a lower assembly comprising a lower hub with at least one lower cable connection thereon which is connected to a downhole device by a lower cable;

supporting the lower assembly in the well;

running in an upper assembly with an upper hub and at least one upper conduit extending into said upper hub;

connecting said hubs downhole;

aligning said upper conduit with said cable connection by said connecting; and delivering an upper cable connection, connected to an upper cable, into contact with said lower cable connection through said upper conduit after said connecting;

providing at least two upper conduits;

creating a circuit of two said upper conduits connected by a passage in at least one of said hubs;

delivering said upper cable with circulation through said circuit.

22. A method of making a downhole connection, comprising:

running in a lower assembly comprising a lower hub with at least one lower cable connection thereon which is connected to a downhole device by a lower cable;

supporting the lower assembly in the well;

running in an upper assembly with an upper hub and at least one upper conduit extending into said upper hub;

connecting said hubs downhole;

aligning said upper conduit with said cable connection by said connecting; and delivering an upper cable connection, connected to an upper cable, into contact with said lower cable connection through said upper conduit after said connecting;

providing at least two upper conduits;

creating a circuit of two said upper conduits connected by a passage in at least one of said hubs;

delivering said upper cable with circulation through said circuit;

at least partially blocking said passage when said second cable connection contacts said first cable connection; and using such blockage to create a pressure spike in said circuit as a surface signal of connection.

23. A cable connection for downhole use, comprising:

a lower string further comprising a first hub adjacent an upper end thereof and at least one first cable connection in said first hub further comprising at least one first cable extending from said first cable connection and operatively connected to at least one downhole device;

an upper string comprising a second hub adjacent a lower end and at least one upper conduit extending from said hub along said upper string, said hubs when connected downhole provide an alignment of said at least one upper conduit with a passage to said at least one first cable connection; and at least one second cable having a second cable connection adjacent a lower end thereof that, upon delivery through said at least one upper conduit to said passage after connection of said hubs, makes contact with said at least one first cable connection;

a lower conduit extending from said first hub to the downhole device with said first cable disposed therein;

said passage in part bypasses said first cable connection to allow a pressure to be communicated to said lower conduit to a second device different from that connected to said first cable.

24. The connection of claim 23, wherein:

said at least one upper conduit comprises at least two upper conduits in fluid communication with said passage;

whereupon with said first and second cable connections connected and said second cable disposed in one said upper conduit, said second device can be pressure operated from another upper conduit.

* * * * *